United States Patent [19]

Schmidt et al.

[11] Patent Number: 5,656,716

[45] Date of Patent: Aug. 12, 1997

[54] TITANIUM-CONTAINING CATALYST AND PROCESS FOR THE PRODUCTION OF POLYESTER

[75] Inventors: Wolfgang Schmidt, Heylstrasse; Ulrich Thiele, Bruchkoebel; Wolf-dieter Griebler, Moers; Bernd Hirthe, Toenisvorst; Elke Hirschberg, Moers, all of Germany

[73] Assignees: Zimmer Aktiengesellschaft, Frankfurt; Sachtleben Chemie GmbH, Duisburg, both of Germany

[21] Appl. No.: 617,562

[22] Filed: Mar. 19, 1996

[30] Foreign Application Priority Data

Apr. 7, 1995 [DE] Germany ............... 195 13 056.1

[51] Int. Cl.$^6$ ............................................ C08G 64/00
[52] U.S. Cl. ............... 528/279; 528/176; 528/193; 528/194; 528/272; 502/150; 502/300; 502/349; 502/350
[58] Field of Search .................. 528/272, 279, 528/176, 193, 194; 502/300, 349, 350, 150

[56] References Cited

U.S. PATENT DOCUMENTS

| | | | |
|---|---|---|---|
| 3,862,087 | 1/1975 | Heller et al. | 528/186 |
| 4,031,165 | 6/1977 | Saiki et al. | 525/444 |
| 4,365,054 | 12/1982 | Stabley, Jr. | 528/277 |
| 4,483,970 | 11/1984 | Huntjens et al. | 525/440 |
| 4,611,049 | 9/1986 | Kuratsuji et al. | 528/279 |

*Primary Examiner*—Terressa Mosley
*Attorney, Agent, or Firm*—McDonnell Boehnen Hulbert & Berghoff

[57] ABSTRACT

The present invention comprises a new catalyst for the production of polyesters consisting essentially of a finely dispersed, large surface area titanium compound selected from hydrated $TiO_2$ obtained by hydrolysis and having the composition $yTiO_2.zH_2O$ and from titanates having the composition $(Me_nO)_x.(TiO_2)_y.(H_2O)_z$, wherein Me is an alkaline earth metal or alkali metal. In addition, the present method comprises a process for the production of polyesters using this catalyst as an esterification or transesterification catalyst and as a polycondensation catalyst, whereby a phosphorous-oxygen-compound is added immediately before, during, or after the polycondensation.

11 Claims, No Drawings

TITANIUM-CONTAINING CATALYST AND PROCESS FOR THE PRODUCTION OF POLYESTER

BACKGROUND

1. Field of the Invention

The invention relates to a titanium-containing catalyst with high catalytic activity for the production of polyester, whereby the catalytic activity is not reduced by the water formed during esterification. The invention also relates to a process for the production of thermostable, perfectly colored polyesters with an ether-content as low as possible by esterification or transesterification and subsequent polycondensation in the presence of this titanium-containing catalyst.

2. Summary of the Related Art

Generally, polyesters are produced by reaction of a diol with a dicarboxylic acid or a lower alkyl ester of a dicarboxylic acid, e.g., the dimethylester. At first, the corresponding dicarboxylic acid diester is formed, which is then polycondensed at increasing temperature and reduced pressure, whereby diol and water are split off. Both reaction steps need catalysts or are at least accelerated by them. Titanium compounds are suitable catalysts for the esterification, compounds of Mn, Co or Zn for the transesterification, and compounds of Sb, Ti, Pb, Ge, Zn or Sn for the polycondensation, whereby the compounds are in general oxides, alcoholates, acetates, or carboxylates. The amount of metal in the catalyst ranges mostly between 20 and 500 ppm, based on polyester.

Among these catalysts the titanium compounds are the most effective and the most widely usable because they are absolutely non-poisonous and can be used for the esterification or transesterification as well as for the polycondensation. Only for polyethylene terephthalate (PET) is the use of co-catalysts necessary to avoid discoloring. The use of the titanium as catalyst takes place mainly in the form of alcoholates, but the use of titanium salts is also described. However, the frequently used titanium alcoholates are known to be hydrolyzed during the esterification stage by the water formed there, and by this to be catalytically inactivated, which makes a further addition of catalyst in the polycondensation and generally high amounts of catalyst necessary.

There are no definite reports on the catalytic activity of $TiO_2$, but in general it is assumed to be to a large extent catalytically inactive. $TiO_2$ is used, in addition to usual catalysts, in large quantities, mostly in the anatase form in the PET fiber production as a delustering agent and as a white pigment. The usual concentrations are 0.1 to 3 wt. % $TiO_2$/PET. In the process of U.S. Pat. No. 2,906,737, $TiO_2$ is used in the rutile form in quantities of 0.01 to 5 wt. % $TiO_2$ as an esterification and polycondensation catalyst. The esterification time of more than 7 hours is a distinct drawback of this method, however. According to U.S. Pat. No. 3,056,817, a titanium dioxide gel obtained by alkaline precipitation and consisting of about 5 wt. % $TiO_2$ and 95 wt. % water is used in quantities of 0.01 to 10 wt. %, based on dicarboxylic acid as catalyst for the esterification stage. However, the catalytic activity of titanium dioxides produced in this way is very low. In the process of U.S. Pat. No. 3,463,742, freshly precipitated titanium dioxide hydrate is freed from residual water, dispersed in butanol, and the suspension in butanol (with 2 to 20 wt. % Ti) used as catalyst for the transesterification and polycondensation of polyester. Thereafter, however, the butanol contaminates the reaction vapors, which should be recycled within the polyester process. The necessity to freshly produce the catalyst immediately before its use, i.e., to have to construct a catalyst plant in addition to the polyester plant, is disadvantageous in both cases.

The use of various titanium salts, e.g., lithium or sodium titanate is disclosed in U.S. Pat. No. 3,965,071. As polyester with severe discoloration and very high diethylene glycol content is otherwise produced, the titanium catalyst must be completely deactivated after the esterification by addition of phosphorous compounds, and the polycondensation continued in the presence of other catalysts like antimony compounds or the very expensive germanium compounds. U.S. Pat. No. 4,365,054 discloses alkali titanates of the formula $(M_2O)(TiO_2)_n$, wherein n=0.05 to 25 and M is an alkali metal, as catalyst of esterification as well as catalyst of polycondensation for the production of polyester. The highest catalytic activity is achieved with n=3 to 5, but the ether content of the polyester is relatively high, for example 1.33 wt. %. for lithium titanate and 2.15 wt. % for sodium titanate. The titanates are obtained by melting together alkali carbonate and $TiO_2$. The crystallite size and the particle size are not disclosed.

SUMMARY OF THE INVENTION

In light of the foregoing, the object of the present invention is to improve the known titanium-containing catalysts, so that the previously mentioned disadvantages do not occur or at least occur to a lesser extent. The object of the invention concerns also the production of polyester with these improved catalysts.

These objects are achieved according to the invention by a novel catalyst and process for synthesizing polyester using this catalyst. The catalyst consists of a finely dispersed, large surface area titanium compound selected from hydrated titanium dioxide obtained by hydrolysis and having the composition $$yTiO_2 \cdot zH_2O$$

wherein y=1, and z=0.01 to 2, and from titanates having the composition $$(Me_nO)_x \cdot (TiO_2)_y \cdot (H_2O)_z$$

wherein

Me=Li, Ha, K, Rb, Cs, Mg, Ca, Sr or Ba, n=1 for Me=alkaline earth metal, and n=2 for Me=alkali metal, x=0.0001 to 6, y=1, and z=0.01 to 2, having a particle or aggregate size and a specific surface area within a desired range.

DETAILED DESCRIPTION OF THE PREFERRED EMBODIMENTS

The present invention provides a novel catalyst and process for synthesizing polyester using this catalyst. The catalyst consists of a finely dispersed, large surface area titanium compound selected from hydrated titanium dioxide obtained by hydrolysis and having the composition $$yTiO_2 \cdot zH_2O$$

wherein y=1, and z=0.01 to 2, preferably 0.15 to 1.0, and from titanates having the composition

wherein

Me=Li, Na, K, Rb, Cs, Mg, Ca, Sr or Ba, n=1 for Me=alkaline earth metal, and n=2 for Me=alkali metal, x=0.0001 to 6, preferably 0.001 to 0.5, and most preferably 0.02 to 0.04, y=1, and z=0.01 to 2, preferably 0.3 to 0.7, and wherein a large surface area means a crystallite size of not more than 100 nm, preferably of less than 10 nm, corresponding to a specific surface area of more than 10 m²/g, preferably of more than 100 m²/g and finely dispersed means a particle or aggregate size of less than 10 μm, preferably of not more than 1 μm. A large surface can also mean that the catalysts are amorphous with respect to x-rays, i.e., that the crystallite size is below the limit of detection by x-ray diffraction. In the following, this catalyst is generally called titanium catalyst.

In the production of polyesters or co-polyesters by esterification of at least one diol with at least one dicarboxylic acid or transesterification of the diols with the dicarboxylic acid dialkyl esters, and subsequent single- or multiple-step polycondensation, the esterification or the transesterification is carried out in the presence of a quantity of this titanium catalyst corresponding to 0 to 1000 ppm, preferably 10 to 1000 ppm, most preferably 20 to 300 ppm titanium, based on dicarboxylic acid, and the subsequent polycondensation in the presence of a total amount (including the esterification catalyst) of this titanium catalyst corresponding to 20 to 1000 ppm, preferably 30 to 500 ppm, most preferably 40 to 400 ppm titanium, based on dicarboxylic acid, whereby immediately before or during or after the polycondensation a phosphorous-oxygen-compound is further added to the polycondensation mixture in a quantity corresponding to 10 to 200 ppm, preferably 20 to 100 ppm phosphorus, based on dicarboxylic acid.

The diols on which the polyester is based are alkanediols or cycloalkanediols with 2 to 12 carbon-atoms, especially ethylene glycol, 1,3-propanediol, 1,4-butanediol, 1,4-cyclohexanedimethanol or mixtures thereof, and the dicarboxylic acids are aryldicarboxylic acids or cycloalkyldicarboxylic acids, like terephthalic acid, isophthalic acid, naphthalenedicarboxylic acid, 4,4'-biphenyldicarboxylic acid, 1,4-cyclohexanedicarboxylic acid or mixtures thereof. Terephthalic acid is preferred as a main component.

The polyester is produced at usual conditions of temperature and pressure in conventional reactors. In addition to the titanium catalyst of the invention, the usual additives, like branching agents, delustering agents, coloring agents and other agents, can be added to the reaction mixture.

Surprisingly the present titanium catalyst, in comparison to U.S. Pat. No. 4,365,054, resulted in the same or higher catalytic activity in polyethylene terephthalate with lower ether content and distinctly reduced COOH-end group concentration, both properties which are of importance for the thermal stability and the processing ability of the polyester. The titanium catalyst is added at the beginning of the esterification or transesterification, and a further quantity of the catalyst corresponding to 10 to 250 ppm, preferably 30 to 100 ppm titanium, based on dicarboxylic acid, can be optionally added at the beginning of the polycondensation. For polyesters, like polyethylene terephthalate, which can be esterified without a catalyst, the total amount of the titanium catalyst alternatively can be added immediately before or at the beginning of the polycondensation. In none of these processes are other additional catalysts required.

A phosphorous-oxygen-compound, like phosphoric acid, esters of phosphoric acid or of phosphorous acid, phosphonates or phosphonites, is added at any time after the completion of the esterification. This additive has only a negligibly small influence on the catalytic activity of the titanium catalyst. However, its effect on the oxidative and thermo-oxidative stability and on the color of the polyester are advantageous.

In comparison to the preceding cited prior art, the improved catalytic activity of the catalyst of the invention and the distinctly reduced side reactions during polyester production may be due primarily to its extremely finely-dispersed and large surface area structure. The water content of the titanium catalyst and the addition of a phosphorous compound during the polyester production have a certain influence, too. In this regard, it is unimportant if the titanium-catalyst is added to the reaction components as a fine powder or as a suspension in the polyester-forming diol. Before its use, especially after a longer period of storage, the titanium-catalyst suspension may be again finely dispersed by means of a mill, e.g., a ball-mill.

Titanium compounds having the same chemical formula are known. However, the outstanding catalytic activity in the polyester synthesis is new and unexpected and is believed to result from a unique crystallite structure of the catalyst, which, in turn, results from the hydrolysis of TiO(SO₄) solely in water. The hydrolysis of other titanium compounds with water or alkaline solutions leads to titanium compounds that may have similar overall chemical composition but differ in crystallite structure and, therefore, are not suited (or less suited) as polyester catalysts.

These catalysts, which are so excellently suited for polyester synthesis, are produced by hydrolysis, preferably thermal hydrolysis (exclusively with water) of titanyl sulfate (TiOSO₄) and thereafter, depending on the desired alkali or alkaline-earth content, either a) removal of excess acid by washing or by neutralization and washing and optionally drying, or b) reaction with alkali hydroxide or alkaline earth hydroxide at ambient temperature up to boiling temperature, washing and optionally drying, or c) reaction with alkali-hydroxide or alkaline earth hydroxide at ambient temperature up to boiling temperature, washing, partial reaction with mineral acid or carboxylic acid, preferably sulfuric acid, again washing and optionally drying.

For example, catalytically active hydrated TiO₂ with an extremely low Na-content is obtained by thermal hydrolysis of a solution of titanyl sulfate (corresponding to 200 g TiO₂/l) with water at 105° C., subsequent washing until a residual sulfuric acid content of 7 wt. % is obtained, adjusting of the suspension to a concentration of about 330 g TiO₂/l, neutralization of the suspension with a 50 wt. % solution of sodium hydroxide with stirring until a constant pH is reached, washing until a conductivity of the suspension of less than 300 μS/cm is obtained, and finally drying.

Catalytically active sodium titanate with high Na-content is obtained, for example, if the suspension prepared as described before (with a residual sulfuric acid content of 7 wt. %) is mixed in a volume ratio of (a) 250 parts suspension containing 320 g TiO$_2$/l, (b) 200 parts of a 50 wt. % solution of sodium hydroxide, and (c) 200 parts of water, the mixture heated to boiling and kept boiling for 2 hours, the formed sodium titanate washed until a residual NaOH content of less than 3 g/l in the washing water is obtained, and the resulting composition dried.

Catalytically active sodium titanate with intermediary Na-content is formed, for example, if the titanate with high Na-content described before having a solid content of the suspension of 10 wt. % is adjusted before drying to a pH value of 3 with 30 wt. % sulfuric acid and readjusted again to pH 3 after a dwell time of 30 minutes. The acid-treated suspension is washed until a conductivity of less than 1000 µS/cm in the filtrate is obtained, and it is thereafter dried.

The shelf life of these titanium catalysts is excellent, the catalytic activity for polyester synthesis being independent of the duration of storage.

The following Examples are presented for illustrative purposes only and are not intended, nor should they be construed, as limiting in any way. The intrinsic viscosities given in the following examples were measured at 25° C. on a solution of 0.5 g polyester in 100 ml of a mixture of phenol and 1,2-dichlorobenzene (3:2 by wt.). The diethylene glycol content was determined by gas chromatography of a trans-esterification mixture obtained from 1 g polyester with 30 ml methanol and 50 mg/l zinc acetate in a Carius tube at 200° C. The COOH-end group concentration has been determined by photometric titration of a solution of polyester in a mixture of o-cresol and chloroform (70:30 by wt.) with 0.05 n-ethanolic potassium hydroxide solution against bromothymol blue.

EXAMPLES

EXAMPLES 1 to 5

The esterification of terephthalic acid (TPA) and the transesterification of dimethyl terephthalate (DMT) with different diols was performed in the usual way at atmospheric pressure without catalyst in comparative example 1a, in the presence of titanium tetrabutylate in comparative example 4a, and in the other examples in the presence of different quantities of a sodium titanate powder in accordance with this invention and with about 2 wt. % sodium and about 6 wt. % water, a particle size of about 2 µm and a specific surface area of about 300 m$^2$/g. The results are presented in Table 1.

Whereas the esterification of TPA with ethylene glycol (which proceeds without a catalyst) is not considerably influenced by the presence of 210 ppm of the titanium catalyst (examples 1a/1b), the esterification with 1,3-propanediol, 1,4-butanediol, or 1,4-cyclohexane dimethanol and the transesterification of DMT (both of which require a catalyst) are very much accelerated by small amounts of the titanium catalyst of the invention. In comparison to a conventional catalyst, namely titanium tetrabutylate with the same amount of Ti per TPA, the same degree of conversion is reached after an approximately 20% shorter residence time (examples 4a/4b).

EXAMPLES 6 to 15

To demonstrate the influence of the titanium catalyst of the invention on polycondensation, an esterification product from terephthalic acid and ethylene glycol produced without a catalyst (with a degree of conversion of about 98% and a diethylene glycol content of about 1.0 wt. %) was ground under liquid nitrogen and used as the initial product. For each example, 42.5 parts by wt. of this product were rendered molten under a nitrogen atmosphere together with a titanium catalyst of the invention in an amount corresponding to 105 ppm Ti/TPA (i.e., Ti based on TPA). In example 6 an antimony triacetate catalyst in an amount of 170 ppm Ti/TPA was used for comparison. As soon as the product was molten, triphenyl phosphate in an amount corresponding to 76 ppm P/TPA was added (except in examples 6 and 13 to 15) and precondensation started at about 270° C. and stepwise reduced pressure (200 and 50 mbar). After a residence time of 60 to 70 min the pressure was reduced to <1 mbar and the mixture polycondensed at 275°–285° C. for 180 min. The results are presented in Table 2.

As is clear, the catalytic activity of the catalysts of examples 7 to 9 and 12 is distinctly superior to that of the commonly used antimony catalysts: with the same residence time, the titanium catalysts of the invention yielded polyethylene terephthalate with a much higher intrinsic viscosity and otherwise equal quality. A comparison of examples 12 and 13 shows that at the same residence time the added phosphorous compound decreased the intrinsic viscosity of the polyester, but assured that the desired neutral-white color of the polyester and a reduction of the carboxyl end group concentration and of the diethylene glycol content was obtained. With the catalysts of examples 10 and 11 a somewhat lower quantity of the phosphorous stabilizer should be used for better evaluation of the catalytic activity.

EXAMPLE 16

299 parts by wt. of terephthalic acid were esterified with 191.8 parts by wt. of 1,3-propanediol in the presence of the sodium titanate powder used in examples 1 to 5 (in an amount corresponding to 150 ppm Ti/TPA) at 230° C. and atmospheric pressure. After esterification, a further amount of the same catalyst, corresponding to 130 ppm Ti/TPA was added. The precondensation was carried out at 240°–260° C. and stepwise reduced pressure (200 and 100 mbar). After a residence time of 60–80 minutes the mixture was polycondensed for 120 minutes at 265° C. and a pressure of <1 mbar. Towards the end of the polycondensation 10 ppm P/TPA as triphenyl phosphate were added. The resulting polypropylene terephthalate had an intrinsic viscosity of 0.801 dl/g and a -COOH end group concentration of 23 meq/kg, whereby its neutral-white color is clearly superior to the color of polypropylene terephthalate produced with conventional catalysts.

EXAMPLE 17

249.2 parts by wt. terephthalic acid and 259.6 parts by wt. 1,4-cyclohexane dimethanol were esterified in the presence of the sodium titanate powder used in examples 1–5 at about 220° C. The amount of catalyst corresponded to 47 ppm Ti/TPA. After esterification a further amount of the same catalyst corresponding to 140 ppm Ti/TPA was added, and the mixture precondensed for 60 minutes at 280° C. under reduced pressure (100 mbar). The subsequent polycondensation was performed at 300° C. under a pressure of <1 mbar for 75 minutes. Towards the end of the polycondensation 10 ppm P/TPA as triphenyl phosphate were added. The resulting poly(cyelohexanedimethylene)-terephthalate had an intrinsic viscosity of 0.546 dl/g and a -COOH end group concentration of 46 meq/kg.

EXAMPLE 18

291.3 parts by wt. of dimethyl terephthalate were transesterified with 270.4 parts by wt. 1,4-butanediol at 220° C.

The sodium titanate powder used in examples 1–5 was used as a catalyst in an amount corresponding to 78 ppm Ti/TPA. After transesterification, the same amount of catalyst was added again, and the mixture precondensed at 235° C. and stepwise reduced pressure (100 and 50 mbar) for 110 minutes. The polycondensation was carried out at 250° C. under a pressure of <1 mbar for 75 minutes. Towards the end of the polycondensation, 10 ppm P/TPA as triphenyl phosphate were added. The resulting polybutylene terephthalate had an intrinsic viscosity of 0.903 dl/g and a -COOH end group concentration of 20 meq/kg.

$z=0.01$ to 2 and wherein said large surface area means a crystallite size of not more than 100 nm and a specific surface area of more than 10 m²/g, and finely dispersed means a particle or aggregate size of less than 10 μm.

2. A catalyst of claim 1, wherein the crystallite size is less than 10 nm, the specific surface area is more than 100 m²/g, and the particle or aggregate size is not more than 1 μm.

3. A catalyst of claim 1, wherein the crystallite size is below the limit of detection by x-ray diffraction.

4. A catalyst of claim 1 obtained by hydrolysis of titanyl sulfate, optionally followed by removal of excess acid by

TABLE 1

| Example No. | Acid Compound Kind | Acid Compound Parts by wt. | Diol Kind | Diol Parts by wt. | Catalyst (a) (ppm TI/TPA) | Approximate Temperature (°C.) | Reaction time (min.) | Degree of Conversion (%) |
|---|---|---|---|---|---|---|---|---|
| 1a | TPA | 68.5 | EG | 76.8 | — | 240 | 135 | 89.2 |
| 1b | TPA | 68.5 | EG | 76.8 | 210 | 240 | 135 | 89.4 |
| 2 | TPA | 10.0 | BD | 16.6 | 533 | 240 | 75 | 98.8 |
| 3 | TPA | 12.0 | CHDM | 20.8 | 40 | 200 | 80 | 99.8 |
| 4a | TPA | 30.0 | PD | 19.3 | (b) | 240 | 225 | 99.0 |
| 4b | TPA | 16.6 | PD | 15.2 | 150 | 195 | 185 | 99.1 |
| 5 | DMT | 291.3 | BD | 270.4 | 78 | 220 | 180 | 99.3 |

EG = ethylene glycol
PD = 1,3-propanediol
BD = 1,4-butanediol
CHDM = 1,4-cyclohexane dimethanol
(a) = sodium titanate with ca. 2 wt. % Na and ea. 6 wt. % H₂O
(b) = 150 ppm TI/TPA as titanium tetrabutylate (without sodium titanate)

TABLE 2

| Example No. | crystalline form | crystallite size(nm) | particle size (μm) | spec. surface (m²/g) | Na-content (wt. %) | water content (wt %) | I.V. (dl/g) | COOH (meq/kg) | DEG (wt %) | Color |
|---|---|---|---|---|---|---|---|---|---|---|
| 6 | (d) | — | — | — | — | — | 0.483 | 10 | 1.20 | white |
| 7 | amorph. | X | ca. 2 | ca. 300 | ca. 2 | 4.8 | 0.634 | 10 | 1.13 | white |
| 8 | amorph. | X | ca. 2 | ca. 300 | ca. 2 | 7.4 | 0.664 | 10 | 1.18 | white |
| 9 | amorph | X | ca. 2 | ca. 300 | ca. 2 | 13.5 | 0.608 | 10 | 1.08 | white |
| 10 | amorph | X | ca. 2 | ca. 300 | ca. 2 | 8.0 | 0.461 | 11 | 1.01 | white |
| 11 | Anatase | ca. 5 | ca. 0.1 | ca. 300 | ca. 0.008 | 6.8 | 0.302 | 11 | 1.00 | white |
| 12 | amorph. | X | ca. 2 | ca. 300 | ca. 2 | ca. 6 | 0.612 | 14 | 1.05 | white |
| 13 | amorph. | X | ca. 2 | ca. 300 | ca. 2 | ca. 6 | 0.886 | 20 | 1.17 | yellow |
| 14 | Anatase | ca. 7 | ca. 1.5 | ca. 300 | ca. 0.004 | 4.5 | 0.705 | 14 | 0.96 | grey |
| 15 | amorph. (e) | X | ca. 2 | ca. 300 | ca. 2 | ca. 6 | 0.782 | 21 | 1.34 | yellow |

I.V. = intrinsic viscosity
amorph. = amorphous
X = below the limit of detection by x-ray diffraction
(c) = Example 7–10, 12–13 and 15 sodium titanate, Example 11 and 14 TiO₂.zH₂O
(d) = 170 ppm Sb/TPA as antimony triacetate in ethylene glycol
(e) = as 33% suspension in ethylene glycol

We claim:

1. A catalyst for the production of polyesters consisting essentially of a finely dispersed, large surface area titanate obtained by hydrolysis and having the composition $(Me_nO)_x \cdot (TiO_2)_y \cdot (H_2O)_z$

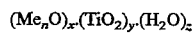

wherein

Me=Li, Na, K, Rb, Ca, Mg, Ca, Sr or Ba
n=1 for Me=alkaline earth metal and
n=2 for Me=alkali metal
x=0.0001 to 6
y=1 neutralization, washing, or both, or by treatment with alkalihydroxide or alkaline earth hydroxide at a temperature in the range of ambient temperature to boiling temperature, followed by washing, optionally followed by partial reaction with a mineral acid or a carboxylic acid, followed by washing again, and optionally followed by drying.

5. A catalyst of claim 4 obtained by thermal hydrolysis of titanyl sulfate exclusively with water.

6. In a process for the production of polyesters or copolyesters by esterification of at least one diol with at least one dicarboxylic acid or by transesterification of at least one diol with at least one dicarboxylic acid dialkylester, and subsequent polycondensation, the improvement comprising carrying out said esterification or transesterification in the presence of the catalyst of claim 1 in a quantity corresponding to 0–1000 ppm titanium, based on dicarboxylic acid, and carrying out said polycondensation in the presence of the catalyst of claim 1 in a total amount corresponding to 20–1000 ppm titanium, based on dicarboxylic acid, and adding immediately before, during, or after said polycondensation a phosphorous-oxygen-compound in a quantity corresponding to 10–200 ppm phosphorus, based on dicarboxylic acid.

7. The process of claim 6 in which the total amount of said catalyst is added before or at the beginning of said esterification or transesterification.

8. The process of claim 6, in which a first quantity of said catalyst is added before or at the beginning of said esterification or transesterification, and a second quantity of said catalyst corresponding to 10 to 250 ppm titanium, based on dicarboxylic acid, is added immediately before or at the beginning of said polycondensation.

9. The process of claim 6, in which the total amount of said catalyst is added immediately before or at the beginning of said polycondensation.

10. The process of claim 6, in which said esterification or transesterification is carried out in the presence of a quantity of said catalyst corresponding to 20–300 ppm titanium, based on dicarboxylic acid.

11. The process of claim 6 in which said catalyst is added as a powder or as a suspension in the polyester-forming diol.

* * * * *